(12) United States Patent  
Hisano

(10) Patent No.: US 10,877,578 B2  
(45) Date of Patent: Dec. 29, 2020

(54) SENSOR CONTROLLER AND ACTIVE PEN

(71) Applicant: Wacom Co., Ltd., Saitama (JP)

(72) Inventor: Haruhiko Hisano, Kanagawa (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/509,582

(22) Filed: Jul. 12, 2019

(65) Prior Publication Data

US 2020/0026369 A1    Jan. 23, 2020

(30) Foreign Application Priority Data

Jul. 18, 2018    (JP) .................................. 2018-135288

(51) Int. Cl.
    *G06F 3/0354*    (2013.01)
    *G06F 3/044*    (2006.01)

(52) U.S. Cl.
    CPC ........ *G06F 3/03545* (2013.01); *G06F 3/0441* (2019.05); *G06F 3/0446* (2019.05); *G06F 2203/04101* (2013.01)

(58) Field of Classification Search
    CPC .. G06F 3/03545; G06F 3/0441; G06F 3/0446; G06F 2203/04101; G06F 3/0442; G06F 3/04162; G06F 3/0383; G06F 3/0416
    See application file for complete search history.

(56) References Cited

U.S. PATENT DOCUMENTS

| | | | |
|---|---|---|---|
| 2010/0156831 A1* | 6/2010 | Doubrava | G06F 3/046 345/173 |
| 2014/0253469 A1* | 9/2014 | Hicks | G06F 3/03545 345/173 |
| 2016/0246390 A1 | 8/2016 | Lukanc et al. | |
| 2017/0060274 A1* | 3/2017 | Watanabe | G06F 3/044 |
| 2019/0121453 A1* | 4/2019 | Dekel | G06F 3/03545 |
| 2019/0179431 A1* | 6/2019 | Klein | G06F 3/03545 |

FOREIGN PATENT DOCUMENTS

| | | |
|---|---|---|
| JP | 2011-18090 A | 1/2011 |
| WO | 2016/139861 A1 | 9/2016 |

\* cited by examiner

*Primary Examiner* — Rodney Amadiz  
(74) *Attorney, Agent, or Firm* — Seed IP Law Group LLP

(57) ABSTRACT

A sensor controller is connected to a sensor electrode to detect positions of one or more active pens depending on charge induced on the sensor electrode. The sensor controller includes a processor; and a memory coupled to the processor, the memory storing instructions that, when executed by the processor, cause the sensor controller to: detect that one or more active pens is approaching the sensor electrode using the sensor electrode; pair with the detected one or more active pens and update pairing state information indicative of a pairing state of each of the one or more active pens paired with the sensor controller; and broadcast the pairing state information from the sensor electrode to the one or more active pens via an uplink signal that is a reference for time synchronization.

7 Claims, 7 Drawing Sheets

FIG. 5A
UPLINK SIGNAL (TYPE 1)

| US TYPE FLAG 1 | FRAME STRUCTURE INFORMATION | COMMUNICATION CONFIGURATION DATA | PAIRING STATE INFORMATION | | | | | | |
|---|---|---|---|---|---|---|---|---|---|
| | | | PAIRING ENABLE/DISABLE FLAG | LPID 1 PAIRING FLAG | LPID 2 PAIRING FLAG | LPID 3 PAIRING FLAG | LPID 4 PAIRING FLAG | LPID 5 PAIRING FLAG | LPID 6 PAIRING FLAG |
| 0 | | | 1 | 0 | 0 | 0 | 0 | 0 | 0 |

FIG. 5B
UPLINK SIGNAL (TYPE 2)

| US TYPE FLAG 1 | US TYPE FLAG 2 | PAIRING TARGET ACTIVE PEN INFORMATION | PAIRING STATE INFORMATION | | | | | |
|---|---|---|---|---|---|---|---|---|
| | | | LPID 1 PAIRING FLAG | LPID 2 PAIRING FLAG | LPID 3 PAIRING FLAG | LPID 4 PAIRING FLAG | LPID 5 PAIRING FLAG | LPID 6 PAIRING FLAG |
| 1 | 0 | | 1 | 0 | 0 | 0 | 0 | 0 |

FIG. 5C
UPLINK SIGNAL (TYPE 3)

| US TYPE FLAG 1 | US TYPE FLAG 2 | COMMAND (INCLUDING LPID) | PAIRING STATE INFORMATION | | | | | |
|---|---|---|---|---|---|---|---|---|
| | | | LPID 1 PAIRING FLAG | LPID 2 PAIRING FLAG | LPID 3 PAIRING FLAG | LPID 4 PAIRING FLAG | LPID 5 PAIRING FLAG | LPID 6 PAIRING FLAG |
| 1 | 1 | | 1 | 0 | 0 | 0 | 0 | 0 |

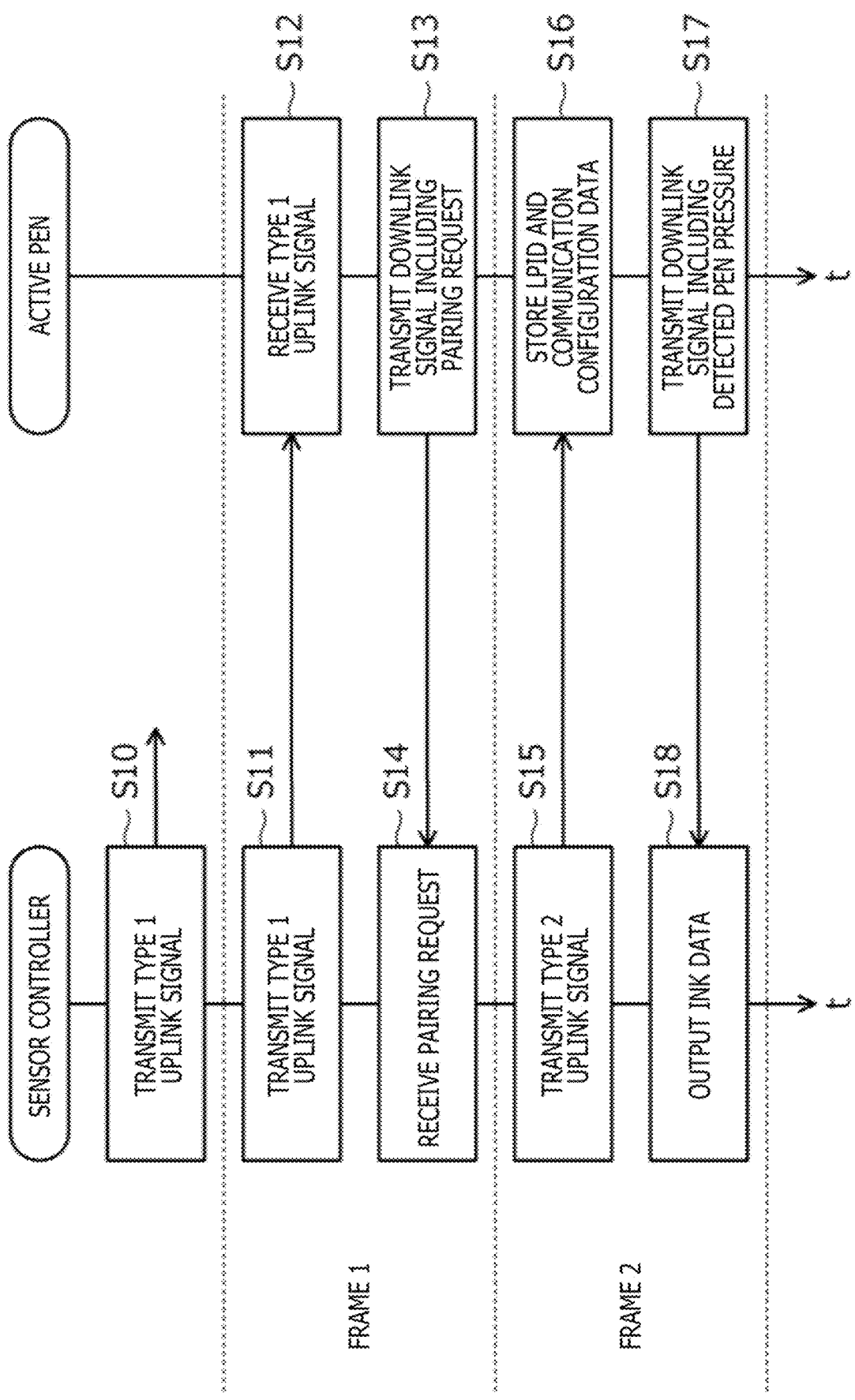

SENSOR CONTROLLER AND ACTIVE PEN

BACKGROUND

Technical Field

The present disclosure relates to a sensor controller and an active pen, an in particular, to a sensor controller and an active pen that are paired.

Description of the Related Art

A system is known that performs bidirectional communication and includes an active pen and a sensor controller that are paired. In a system of this type, the sensor controller transmits an uplink signal including a new local pen identifier (ID) and assigned communication configuration data (frequencies, time slots, and the like allowed to be used for transmission of downlink signals), and the active pen receives the uplink signal and returns a response. Pairing identified by the local pen ID is then established. After the pairing is established, the active pen utilizes the assigned communication configuration data to transmit a downlink signal.

U.S. Patent Application No. 2016/0246390 (hereinafter, Patent Document 1) discloses an example of the system as described above. According to a technique in Patent Document 1, the sensor controller is configured to hold a quiet ID list. The quiet ID list is a list storing local pen IDs as described above. In a case where reception of a downlink signal from the paired active pen has been interrupted, the sensor controller stores, in the quiet ID list, the local pen ID assigned to the active pen. The local pen IDs stored in the quiet ID list are sequentially assigned to new pairings in the chronological order, oldest first.

However, the technique described in Patent Document 1 disadvantageously delivers degraded performance of the system due to a process for maintaining and managing the pairing state. This will be described below in detail.

While consecutively receiving uplink signals, the active pen can recognize whether or not the sensor controller still maintains the pairing state with the active pen, on the basis of whether or not each of the uplink signals includes a command directed to the active pen. However, when the active pen fails to receive uplink signals due to, for example, separation from a touch surface, the active pen may not recognize whether or not the sensor controller still maintains the pairing state with the active pen. As a result, the next time the active pen transmits a downlink signal, the active pen fails to determine whether or not the same communication configuration data may be utilized for the transmission.

Thus, in a case of failing to receive an uplink signal at a timing when the active pen otherwise receives the uplink signal, the active pen unilaterally cancels the pairing state, or subsequently when transmitting a downlink signal, performs bidirectional communication with the sensor controller to check the pairing state. However, regardless of which of these processes is executed, inputting fails to be immediately started at the time of next pen down, and the system appears to a user to be delivering degraded performance. In particular, in a case where entrance to and exit from a coverage of uplink signals frequently occur within a short time such as in writing of characters, cancelation or check of the pairing state is performed each time entrance or exit occurs. This causes the performance to appear to be significantly degraded. Furthermore, one uplink signal allows only one active pen to be paired or checked, and thus, in a case where one sensor controller is simultaneously paired with a plurality of active pens (such a case is hereinafter referred to as "multi-pen"), the performance appears to be further degraded.

BRIEF SUMMARY

Thus, an object of the present disclosure is to provide a sensor controller and an active pen capable of suppressing degradation of performance caused by a process for maintaining and managing the pairing state.

Furthermore, in a case where the above-described multi-pen is used, the user typically varies writing attributes (line color, line type, and the like) for each active pen. Within the system, the writing attributes are associated with the local pen IDs for management. However, the local pen IDs are not notified to the user, and the appearances of the active pens are typically exactly the same. Thus, in the related art, the active pen user fails to find which writing attributes have been assigned to which active pens until the user actually writes with the active pens. This is inconvenient and has been desired to be improved.

Accordingly, another object of the present disclosure is to provide an active pen allowing the user to easily recognize the writing attributes assigned to each active pen.

A first aspect of the present disclosure provides a sensor controller connected to a sensor electrode to detect positions of one or more active pens depending on charge induced on the sensor electrode, the sensor controller that includes a processor; and a memory coupled to the processor, the memory storing instructions that, when executed by the processor, cause the sensor controller to: detect that the one or more active pen is approaching the sensor electrode, using the sensor electrode; pair with the detected one or more active pens and update pairing state information indicative of a pairing state of each of the one or more active pens paired with the sensor controller; and broadcast the pairing state information from the sensor electrode to the one or more active pens via an uplink signal that is a reference for time synchronization.

A first aspect of the present disclosure provides an active pen communicating with a sensor controller connected to a sensor electrode, the active pen including a pen tip electrode and an integrated circuit connected to the pen tip electrode. The integrated circuit, in operation, detects, via a coupling capacitance between the pen tip electrode and the sensor electrode, an uplink signal including pairing state information indicative of a pairing state of each of one or more active pens with which the sensor controller is paired, and maintains or cancels a pairing state of the active stylus based on the pairing state information that has been detected, and in a case where the pairing state is maintained, transmits a downlink signal configured based on the pairing state of the active stylus.

A second aspect of the present disclosure provides an active pen communicating with a sensor controller connected to a sensor electrode, the active pen including a pen tip electrode, an integrated circuit connected to the pen tip electrode, and an indicator. The integrated circuit, in operation, controls the indicator to cause the indicator to provide a visual display that indicates a local pen ID in a case where the local pen ID is provided to the active pen by an uplink signal transmitted by the sensor controller.

According to the first aspect of the present disclosure, the pairing state information is broadcasted by the uplink signal to all of the one or more active pens paired with the sensor controller, the pairing state information indicative of the pairing state of each of the active pens. Each of the active pens can thus recognize, by seeing the pairing state information, whether or not pairing with the active pen is maintained in the sensor controller. This eliminates a need for unilateral cancelation of the pairing state and bidirectional communication for a check on the pairing state, enabling suppression of degradation of performance caused by a process for maintaining and managing the pairing state.

According to the second aspect of the present disclosure, each of the active pens provides the display for the identification of the local pen ID. This allows the user to easily recognize the writing attributes assigned to each active pen.

BRIEF DESCRIPTION OF THE DRAWINGS

FIGS. 5A, 5B, AND 5C are diagrams illustrating types of the uplink signal transmitted by the sensor controller according to an embodiment of the present disclosure;

FIG. 8 is a sequence diagram of operations of the sensor controller and the active pen according to an embodiment of the present disclosure.

DETAILED DESCRIPTION OF THE PREFERRED EMBODIMENT

An embodiment of the present disclosure will be described below in detail with reference to the attached drawings.

Figure 1:
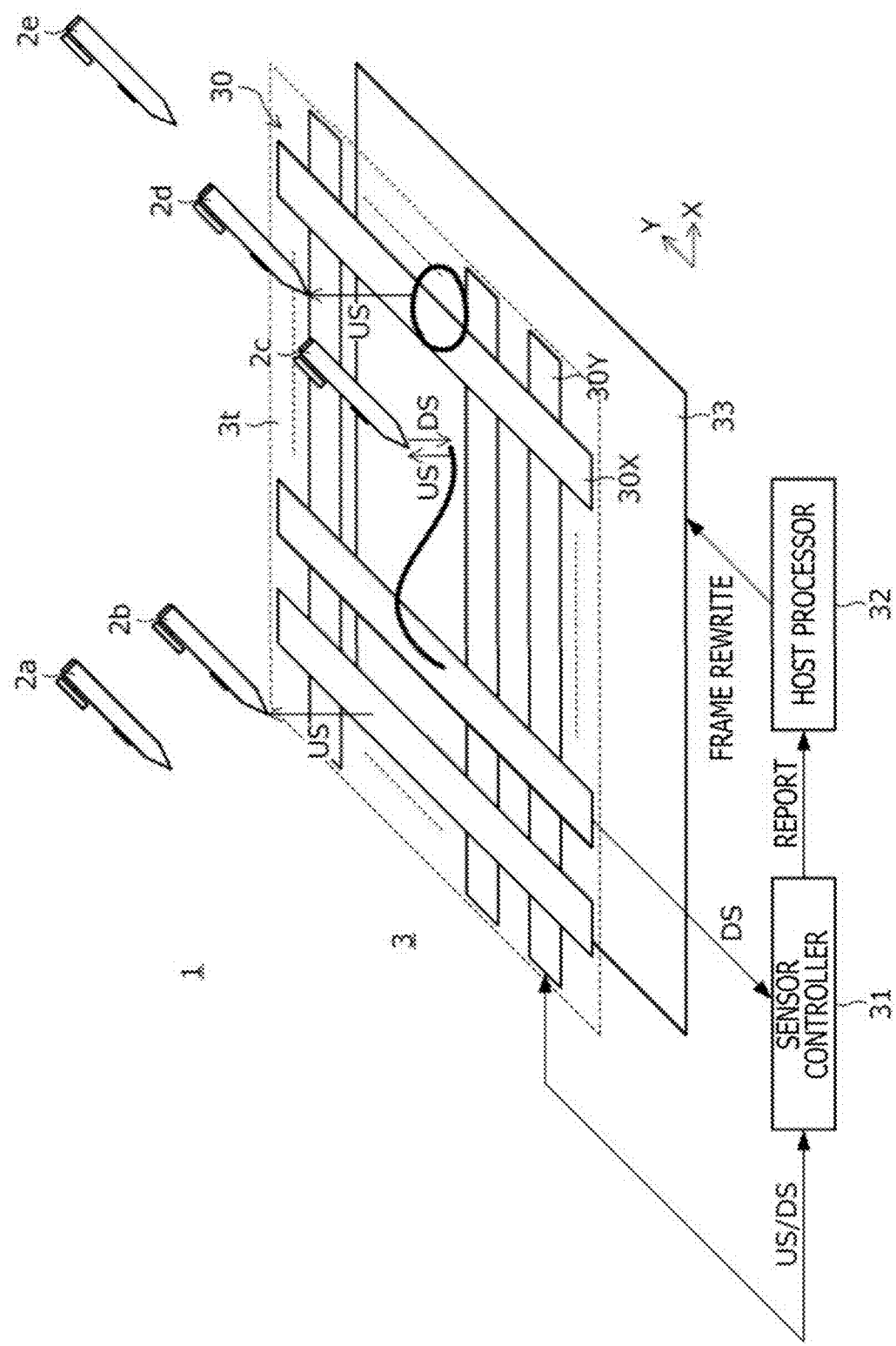
FIG. 1 is a diagram illustrating a general configuration of a position detecting system according to an embodiment of the present disclosure.

FIG. 1 is a diagram illustrating a general configuration of a position detecting system 1 according to an embodiment of the present disclosure. As illustrated in FIG. 1, the position detecting system 1 includes a plurality of active pens 2a to 2e and a position detecting device 3 with a touch surface 3t. In the description below, in a case where the active pens 2a to 2e need not be distinguished from one another, the active pens 2a to 2e may be collectively referred to as the active pen 2.

The active pen 2 is, for example, an electronic pen corresponding to an active capacitive method and is configured to be capable of communicating bidirectionally with the position detecting device 3.

Figure 2:
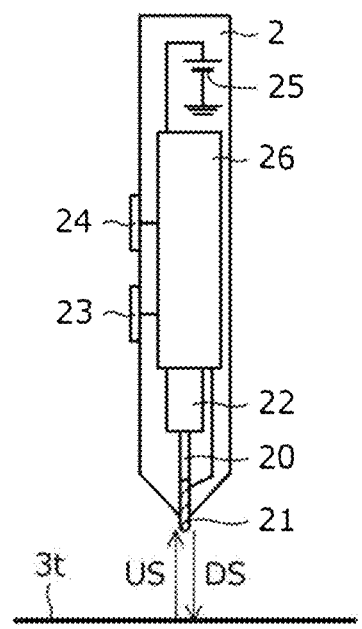
FIG. 2 is a diagram illustrating an internal configuration of an active pen according to an embodiment of the present disclosure.

FIG. 2 is a diagram illustrating an internal configuration of the active pen 2. As illustrated in FIG. 2, the active pen 2 includes a lead 20, a pen tip electrode 21, a pen pressure detector 22, a switch 23, an indicator 24, a power supply 25, and an integrated circuit 26.

The pen tip electrode 21 is a conductor provided near the lead 20 and is electrically connected to the integrated circuit 26 by wiring. The pen pressure detector 22, in operation, detects a force (pen pressure) applied to a tip of the lead 20 (pen tip). Specifically, the pen pressure detector 22 is in abutting contact with a tail end of the lead 20. The pen pressure detector 22 is configured to detect, through the abutting contact, the force applied to the lead 20 when a user presses the pen tip of the active pen 2 against the touch surface 3t of the position detecting device 3. In a specific example, the pen pressure detector 22 includes a variable capacitance module having a capacitance that varies according to a force applied to the pen tip.

The switch 23 is provided on a side surface of the active pen 2 and can be turned on and off by the user. The indicator 24 is a device that provides a visual display that indicates and enables the user to identify a local pen ID applied to the active pen 2 by an uplink signal US described below. The indicator 24 includes, for example, a light emitting diode (LED) number display configured to be capable of displaying numbers or a LED configured to be capable of displaying a plurality of types of colors. The power supply 25 is configured to supply operating power (direct current (DC) voltage) to the integrated circuit 26 and includes, for example, a cylindrical AAAA battery.

The integrated circuit 26 is a processing unit including a group of circuits formed on a substrate (not illustrated) and is connected to each of the pen tip electrode 21, the pen pressure detector 22, the switch 23, and the indicator 24. Processes described below and performed by the active pen 2 are all executed by the integrated circuit 26.

The integrated circuit 26 is configured to be capable of transmitting and receiving signals to and from the position detecting device 3 using the pen tip electrode 21. Among the thus transmitted and received signals, signals transmitted from the position detecting device 3 to the active pen 2 are referred to as uplink signals US, and signals transmitted from the active pen 2 to the position detecting device 3 are referred to as downlink signals DS.

The uplink signal US is typically a signal including a command having contents are used to control of the active pen 2. In the present embodiment, the uplink signal US serves to broadcast, to all of one or more active pens paired with the sensor controller, pairing state information indicative of a pairing state of each of the active pens. The uplink signal US will be described below in detail with reference to FIGS. 5A, 5B, and 5C. Furthermore, a downlink signal DS is a signal including a burst signal corresponding to an unmodulated carrier signal and a data signal corresponding to a carrier signal modulated by a predetermined data. The integrated circuit 26 acquires data to be transmitted, in accordance with the command included in the uplink signal US, and modulates the carrier signal using the acquired data, to transmit the data signal. Data transmitted by the data signal includes a pen pressure detected by the pen pressure detector 22, information indicative of an on/off state of the switch 23, and a global pen ID of the active pen 2. The global pen ID is, unlike the local pen ID, information uniquely assigned to all the active pens 2 and is written into the integrated circuit 26 while the active pens 2 are being manufactured.

Figure 3:
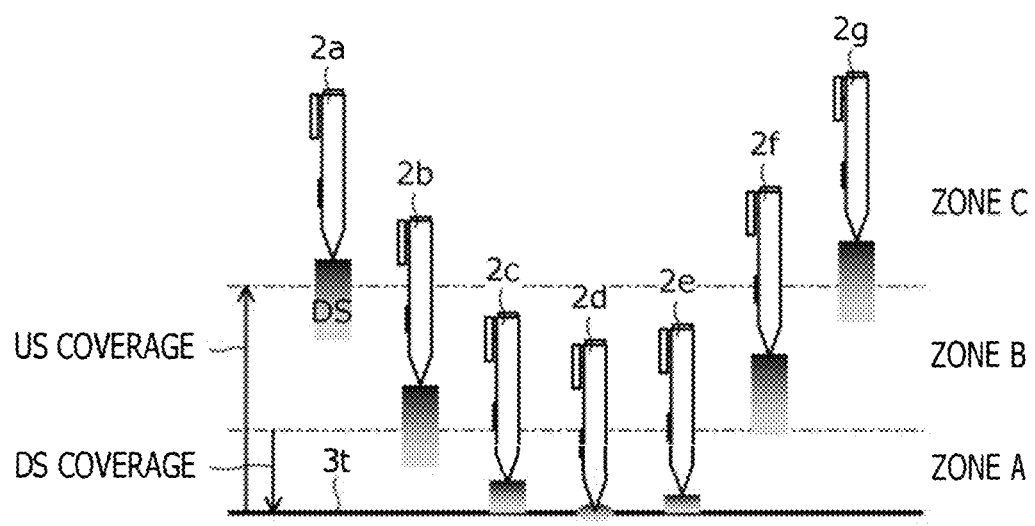
FIG. 3 is a diagram illustrating coverages of an uplink signal and a downlink signal according to an embodiment of the present disclosure.

FIG. 3 is a diagram illustrating coverages of the uplink signal US and the downlink signal DS. A zone A illustrated in FIG. 3 is specified as follows: when the pen tip electrode 21 of the active pen 2 is located in the zone A, the active pen 2 can receive the uplink signal US transmitted by a sensor controller 31 and the sensor controller 31 can receive the downlink signal DS transmitted by the active pen 2. In an example in FIG. 3, active pens 2c, 2d, and 2e are located in a zone A.

The zone B is specified as follows: when the pen tip electrode 21 of the active pen 2 is located in the zone B, the active pen 2 can receive the uplink signal US transmitted by the sensor controller 31, whereas the sensor controller 31 fails to receive the downlink signal DS transmitted by the active pen 2. The zone B is formed because the coverage of the uplink signal US is larger than the coverage of the downlink signal DS as illustrated in FIG. 3. In the example in FIG. 3, the active pens 2*b* and 2*f* are located in the zone B.

The zone C is specified as follows: when the pen tip electrode 21 of the active pen 2 is located in the zone C, the active pen 2 fails to receive the uplink signal US transmitted by the sensor controller 31 and the sensor controller 31 also fails to receive the downlink signal DS transmitted by the active pen 2. In the example in FIG. 3, the active pens 2*a* and 2*g* are located in the zone C.

Thus, the area over the touch surface 3*t* of the position detecting device 3 is classified into the zone A, the zone B, and the zone C in order of increasing distance from the touch surface 3*t*.

Figure 4:
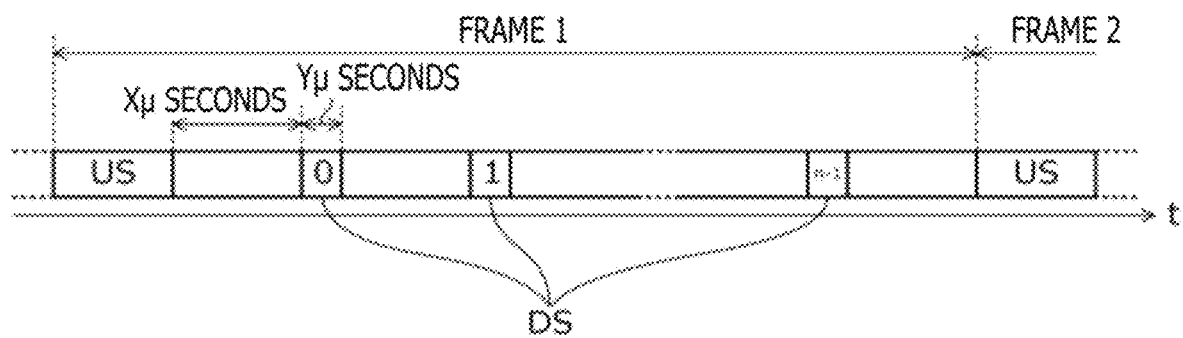
FIG. 4 is a diagram illustrating a structure of a frame used to transmit and receive the uplink signal and the downlink signal according to an embodiment of the present disclosure.

FIG. 4 is a diagram illustrating a structure of a frame used to transmit and receive the uplink signal US and the downlink signal DS. As illustrated in FIG. 4, the uplink signal US and the downlink signal DS are transmitted and received in units of frames. The frame is, for example, a display period for one screen of a display 33 (described below) included in the position detecting device 3. The uplink signal US is typically transmitted at a head of the frame and serves to notify the active pen 2 of a frame start timing (serves as a reference for time synchronization). The uplink signal US may be transmitted a plurality of times within one frame.

A transmission time for the downlink signal DS within the frame is divided into n time slots. Each time slot has a duration of Yμ seconds, and after the uplink signal US is transmitted, the divisional downlink signals DS are arranged within the frame at intervals of Xμ seconds. During a period of Xμ seconds when transmission of the downlink signal DS is not performed, the following are executed: a display operation by the display 33 described below, a finger position detecting operation by the sensor controller 31 described below, and the like. Within each time slot, the downlink signal DS with a predetermined number of symbols is simultaneously transmitted by a plurality of active pens 2.

The position detecting device 3 is configured to assign different combinations of frequencies and time slots to the respective active pens 2 paired with the sensor controller 31. Each of the active pens 2 uses the assigned combination of frequencies and time slots to transmit the downlink signal DS. This enables a plurality of active pens 2 to transmit the downlink signal DS within the same frame.

Referring back to FIG. 1, the position detecting device 3 is a device configured to be capable of detecting the position of each active pen 2 within the touch surface 3*t*. The position detecting device 3 is typically a computer such as a tablet terminal, and a display surface of the display corresponds to the touch surface 3*t*. However, the position detecting device 3 may be a digitizer with no display surface. In the description below, the position detecting device 3 is assumed to be a tablet terminal.

The position detecting device 3 includes a sensor 30 disposed immediately below the touch surface 3*t*, the sensor controller 31, a host processor 32 controlling the functions of units of the position detecting device 3 including the touch surface 3*t* and the controller 31, and the display 33 disposed below the sensor 30.

The sensor 30 constitutes a mutual-capacitance touch sensor and includes a plurality of sensor electrodes 30X and a plurality of sensor electrodes 30Y arranged in a matrix. The plurality of sensor electrodes 30X includes a plurality of linear conductors extending in an illustrated Y direction and arranged at regular intervals in an X direction orthogonal to the Y direction. Furthermore, the plurality of sensor electrodes 30Y includes a plurality of linear conductors extending in the X direction and arranged at regular intervals in the Y direction. FIG. 1 illustrates only some of the plurality of sensor electrodes 30X and 30Y. The plurality of the sensor electrodes 30Y may also serve as common electrodes of the display 33, and in this case, the position detecting device 3 is referred to as an "in-cell type." In contrast, the position detecting device 3 with the common electrodes in the display provided separately from the sensor electrodes 30X and 30Y is referred to as, for example, an "out-cell type" or an "on-cell type." In the description below, the position detecting device 3 is of the in-cell type.

The sensor controller 31 is a device connected to each of the plurality of sensor electrodes 30X and 30Y to detect positions of one or more active pens 2 depending on charge induced on the sensor electrodes 30X and 30Y. Specifically, the sensor controller 31 includes a processor that is coupled to a memory storing instructions, that when executed by the processor, cause the sensor controller 31 to perform a plurality of functions, including a function to detect an indicated position of each active pen 2 on the touch surface 3*t* and receive data transmitted by each active pen 2 using the downlink signal DS, and a function to detect a position of the finger on the touch surface 3*t*. In a case where the position detecting device 3 is of the in-cell type, the sensor controller 31 also performs a function to apply, to the plurality of sensor electrodes 30Y, a common potential needed for the display operation of the display 33 (driving operation for pixel electrodes).

The sensor controller 31 performs, for the active pen 2, a function to transmit the uplink signal US toward each active pen 2 and receive the downlink signal DS transmitted by each active pen 2, through the sensor 30. In a case where the burst signal in the downlink signal DS is received, the sensor controller 31 derives the indicated position of the active pen 2 on the basis of a reception level of the burst signal at each of the sensor electrodes 30X and 30Y, and reports the indicated position to the host processor 32. Furthermore, in a case where the data signal in the downlink signal DS is received, the sensor controller 31 demodulates the data signal to retrieve data transmitted by the active pen 2 and reports the data to the host processor 32.

The host processor 32 is a central processing unit (CPU) controlling the entirety of the position detecting device 3. Various applications such as a drawing application and a communication application are operatively configured on the host processor 32. The drawing application serves to generate and store ink data indicative of a trace of the active pen 2 or the finger on the touch surface 3*t* on the basis of a sequence of positions of the active pen 2 or the finger sequentially reported by the sensor controller 31 and to render the stored ink data. The drawing application also controls the line width, transparency, line color, and the like of the ink data to be rendered, in accordance with the reported data, in a case where a report of the data transmitted from the active pen 2 is received from the sensor controller 31. The host processor 32 further controllably rewrites display contents of the display 33 on a frame-by-frame basis. The display contents of the display 33 include an image resulting from the rendering.

FIGS. 5A, 5B, and 5C are diagrams illustrating types of the uplink signal US transmitted by the sensor controller 31. As illustrated in FIGS. 5A, 5B, and 5C, the uplink signal US includes three types, type 1 to type 3. The sensor controller 31 appropriately uses these types to control the active pens 2.

The type 1 uplink signal US illustrated in FIG. 5A is a signal broadcasted to all the active pens 2 in order to detect approach of each of the active pens 2. The type 1 uplink signal US includes an uplink signal type flag 1, frame structure information, communication configuration data, and pairing state information.

The uplink signal type flag 1 is a flag allowing the active pen 2 to distinguish the type 1 uplink signal US from the type 2 and 3 uplink signals US. In the type 1 uplink signal US, the uplink signal type flag 1 is set to "0." Accordingly, the uplink signal type flag 1 of "0" constitutes address information indicating that the signal is to be transmitted to all the active pens 2.

The frame structure information is information indicative of the structure of the frame identified by a duration of the frame, a position of the uplink signal US within the frame, specific durations of Xμ seconds and Yμ seconds illustrated in FIG. 4, a number of time slots included in the frame, a set of available frequencies, and the like. Specific frame structure information includes identification information indicative of one of a plurality of structures preliminarily shared between the active pen 2 and the sensor controller 31.

The communication configuration data is data indicative of a combination of frequencies and time slots assigned to the active pen 2 with which the sensor controller 31 is to communicate. Specific communication configuration data includes identification information indicative of one of a plurality of combinations preliminarily shared between the active pen 2 and the sensor controller 31.

The pairing state information is information indicative of the pairing state of each of one or more active pens 2 with which the sensor controller 31 is paired. The pairing state information includes a pairing flag indicating whether or not the sensor controller 31 is paired with the active pen 2, for each local pen ID (LPID) assigned to each active pen 2 at the time of pairing. The pairing flag is information indicative of "1" in a case where the corresponding local pen ID is assigned to any of the active pens 2 and of "0" in a case where the corresponding local pen ID is assigned to none of the active pens 2. FIGS. 5A, 5B, and 5C illustrate examples of the sensor controller 31 capable of being simultaneously paired with up to six active pens 2. In this case, six local pen IDs of 1 to 6 are provided, and the pairing state information includes six pairing flags.

Here, the pairing state is one of a state where the pairing is completed and maintained or a state where pairing is not maintained. In the state where the pairing is completed and maintained, configurations are maintained that are needed to enable the active pen 2 to supply signals to the position detecting device 3. Needed configurations include a configuration regarding a communication channel (for example, frequencies or time slots) and a delivery state of communication resources or parameters such as a grant state of a local pen ID. On the other hand, in the state where the pairing is not maintained, the configurations are not provided that are needed to enable the active pen 2 to supply signals to the position detecting device 3.

The pairing state information in the type 1 uplink signal US further includes a pairing enable/disable flag. The pairing enable/disable flag is indicative of "1" when the sensor controller 31 is enabled to establish a new pairing and of "0" when the sensor controller 31 is disabled to establish a new pairing. The sensor controller 31 sets the pairing enable/disable flag to "0" in a case where the sensor controller 31 is paired with a maximum allowable number (six in the example in FIGS. 5A, 5B, and 5C) of active pens 2 and otherwise to "1."

Among the active pens 2 having received the type 1 uplink signal US, the active pens 2 not paired with the sensor controller 31 yet first reference the pairing enable/disable flag. In a case where the pairing enable/disable flag is set to "1," these active pens 2 temporarily store, in a memory (not illustrated), the frame structure information, communication configuration data, and pairing state information included in the received uplink signal US. The active pens 2 also use the frequencies and time slots indicated by the stored communication configuration data to transmit the downlink signal DS including a pairing request. The pairing request includes the above-described global pen ID.

On the other hand, among the active pens 2 having received the type 1 uplink signal US, the active pens 2 paired with the sensor controller 31 each reference the pairing flag corresponding to the local pen ID assigned to the active pen 2. In a case where the pairing flag is set to "1," these active pens 2 continuously maintain the pairing state. On the other hand, in a case where the pairing flag is set to "0," the active pens 2 determine that the sensor controller 31 has canceled the pairing state, and cancel the pairing state.

The type 2 uplink signal US illustrated in FIG. 5B is a signal transmitted as a response to the downlink signal DS including a pairing request in order to pair with the active pen 2 with approach of the active pen 2 detected. The type 2 uplink signal US includes an uplink signal type flag 1, an uplink signal type flag 2, pairing target active pen information, and pairing state information. In the type 2 uplink signal US, the uplink signal type flag 1 is set to "1."

The uplink signal type flag 2 is a flag allowing the active pen 2 to distinguish the type 2 uplink signal US from the type 3 uplink signal US. In the type 2 uplink signal US, the uplink signal US type flag 2 is set to "0."

The pairing target active pen information includes the global pen ID included in the pairing request or a hash value of the global pen ID. Accordingly, the pairing target active pen information constitutes address information indicative of the active pen 2 to which the uplink signal US is to be transmitted. The hash value constituting the pairing target active pen information is calculated by the sensor controller 31 using a predetermined hash function preliminarily shared between the sensor controller 31 and each active pen 2.

The pairing state information in the type 2 uplink signal US is similar to the pairing state information in the type 1 uplink signal US except the type 2 uplink signal US does not include a pairing enable/disable flag. However, in response to reception of the downlink signal DS including the pairing request, the sensor controller 31 determines the local pen ID to be assigned to the active pen 2 having transmitted the downlink signal DS and updates, to "1," the pairing flag corresponding to the determined local pen ID. This is a process for notifying the active pen 2 of the local pen ID to be newly assigned.

In a case of receiving the type 2 uplink signal US, the active pen 2 first determines whether or not the global pen ID or the hash value of the global pen ID included in the pairing target active pen information belongs to the active pen 2. In a case where it is determined that the global pen ID or the hash value belongs to the active pen 2, the active pen 2 compares the pairing state information in the last received and stored type 1 uplink signal US with the pairing state information in the currently received type 2 uplink signal US. As a result of the comparison, the active pen 2 acquires and stores the local pen ID with the corresponding pairing flag changed from "0" to "1," in a memory (not illustrated) as the local pen ID assigned to this active pen 2. The active pen 2 also stores the temporarily stored frame structure information and communication configuration data in the memory (not illustrated). Thus, inside the active pen 2, the pairing state between the active pen 2 and the sensor controller 31 is established.

The active pen 2, having established the pairing state, uses the frequencies and time slots indicated by the stored communication configuration data to transmit the downlink signal DS. The downlink signal DS may include, for example, data indicating a pen pressure. The sensor controller 31 receives the thus transmitted downlink signal DS, and adds, to a list in the memory (not illustrated), information indicative of the active pen 2 having transmitted the downlink signal DS, to establish the state of pairing with the active pen 2.

The type 3 uplink signal US illustrated in FIG. 5C is a signal transmitted to control one of the one or more active pens 2 paired with the sensor controller 31. The type 3 uplink signal US includes an uplink signal type flag 1, an uplink signal type flag 2, a command, and pairing state information. In the type 3 uplink signal US, the uplink signal type flag 1 and the uplink signal type flag 2 are each set to "1."

The command is information including a content of control of the active pen 2 and the local pen ID indicative of the active pen 2 to be controlled. The specific content of the control indicated by the command includes transmission of the pen pressure detected by the pen pressure detector 22 or transmission of information indicative of an on/off state of the switch 23.

In a case of receiving the type 3 uplink signal US, the active pen 2 first determines whether or not the local pen ID assigned to the active pen 2 is included in the command. In a case of determining the local pen ID to be included in the command, the active pen 2 executes a process corresponding to the content of the control indicated by the command. For example, in a case where the content of the control indicated by the command is transmission of the pen pressure detected by the pen pressure detector 22, the active pen 2 acquires the latest pen pressure from the pen pressure detector 22 and includes the pen pressure in the downlink signal DS for transmission.

Figure 6:
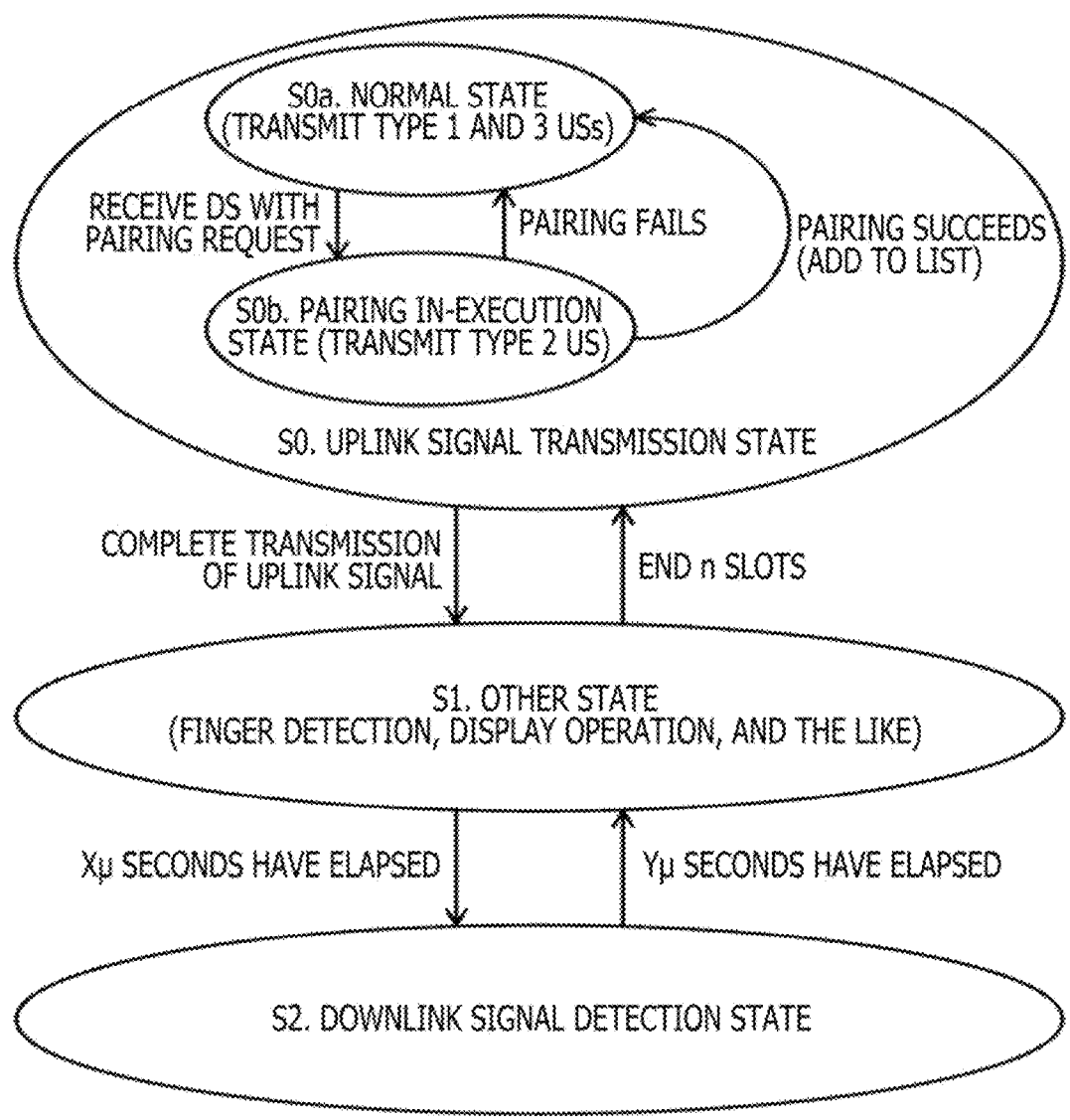
FIG. 6 is a state transition diagram of the sensor controller according to an embodiment of the present disclosure.
Figure 7:
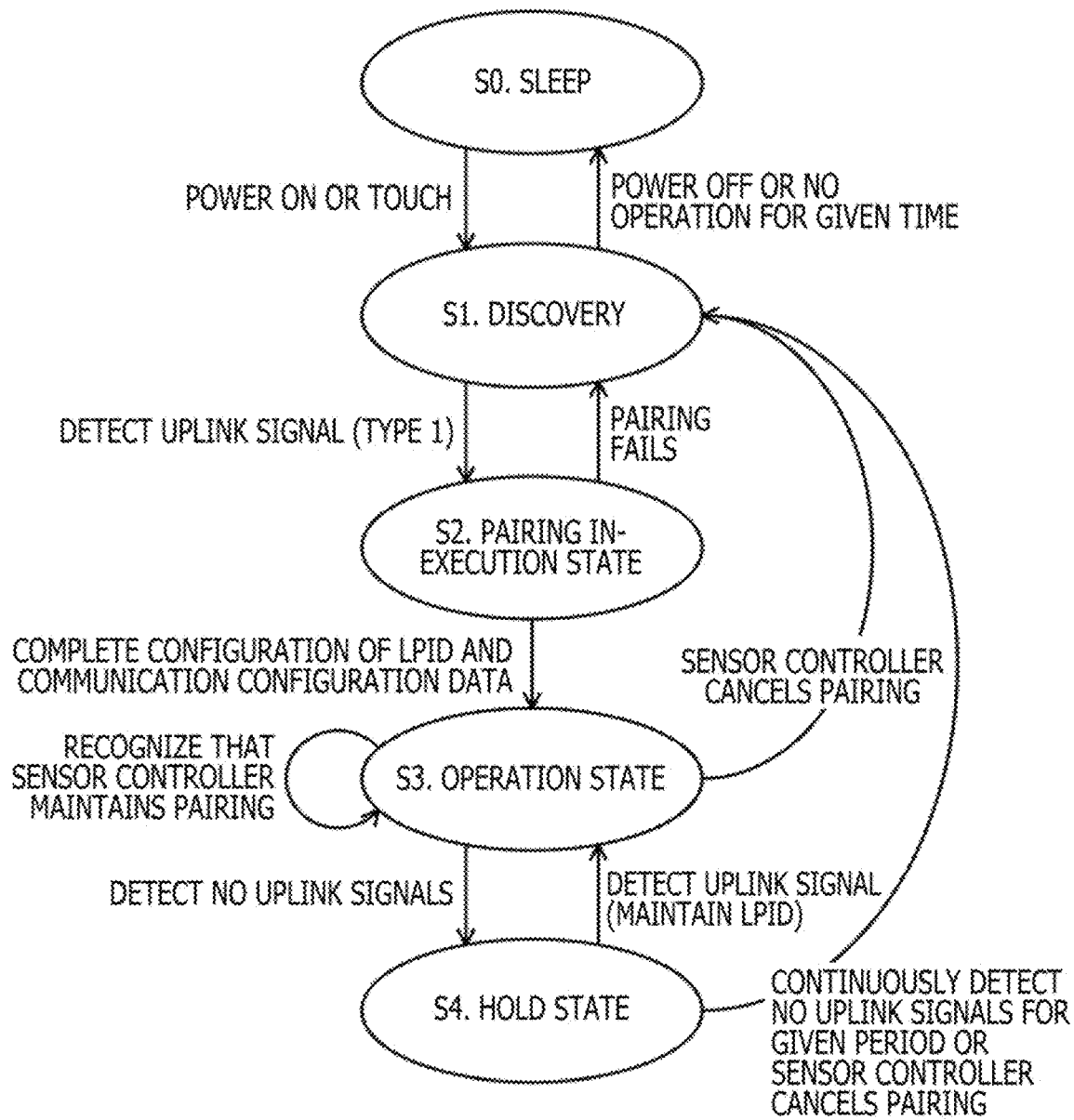
FIG. 7 is a state transition diagram of the active pen according to an embodiment of the present disclosure.

FIG. 6 and FIG. 7 are each a state transition diagram of the sensor controller 31 and the active pen 2. With reference back to FIG. 4 and FIGS. 5A, 5B, and 5C, described above, in addition to FIG. 6 and FIG. 7, operations of the sensor controller 31 and the active pen 2 will be described in further detail.

First, as seen in FIG. 6, the sensor controller 31 is configured to operate in one of an uplink signal transmission state S0, other state S1, and a downlink signal detection state S2. The uplink signal transmission state S0 includes a normal state S0*a* and a pairing in-execution state S0*b*.

The sensor controller 31 is initially in the normal state S0*a*. In this state, the sensor controller 31 transmits one of the type 1 uplink signal US illustrated in FIG. 5A or the type 3 uplink signal US illustrated in FIG. 5C. In this case, the sensor controller 31 suitably transmits type 1 uplink signals US while limiting the interval between the uplink signals US to smaller than a certain value. This enables the sensor controller 31 to be paired, at an appropriate timing, with the active pen 2 newly approaching the sensor controller 31.

In a case of receiving the downlink signal DS including the pairing request in response to the transmitted type 1 uplink signal US, the sensor controller 31 transitions to the pairing in-execution state S0*b*. In the pairing in-execution state S0*b*, the sensor controller 31 transmits the type 2 uplink signal US. As a result, in a case of receiving the downlink signal DS transmitted using the frequencies and time slots indicated by the communication configuration data transmitted in the last type 1 uplink signal US, the sensor controller 31 determines that the pairing has succeeded. The sensor controller 31 adds, to the list (not illustrated), information about the active pen 2 having transmitted the downlink signal DS, to establish the pairing and returns to the normal state S0*a*. On the other hand, in a case of failing to receive such a downlink signal DS, the sensor controller 31 determines that the pairing has failed and returns to the normal state S0*a*.

Once the sensor controller 31 completes transmission of the uplink signal US, the sensor controller 31 temporarily transitions to the other state S1 regardless of the type of the uplink signal US. In the other state S1, the sensor controller 31 performs an operation of detecting the position of the finger or an operation for display on the display 33 (specifically, application of the above-described common potential). While the sensor controller 31 is in the other state S1, the host processor 32 illustrated in FIG. 1 may execute a part of rewrite control of the display contents (for example, control for one gate line). In a case where Xμ seconds have elapsed since the transition to the other state S1, the sensor controller 31 transitions to the downlink signal detection state S2.

After transiting to the downlink signal detection state S2, the sensor controller 31 performs an operation of detecting, via the sensor 30 illustrated in FIG. 1, the downlink signal DS transmitted by the active pen 2. In a case where Yμ seconds have elapsed since the transition to the downlink signal detection state S2, the sensor controller 31 returns to the other state S1 to perform again the operation of detecting the position of the finger or the operation for the display on the display 33.

The sensor controller 31 repeats each of the other state S1 and the downlink signal detection state S2 n times. The sensor controller 31 then returns to the uplink signal transmission state S0 to transmit the uplink signal US.

As seen in FIG. 7, the active pen 2 is configured to operate in one of a sleep state S0, a discovery state S1, a pairing in-execution state S2, an operation state S3, and a hold state S4.

The active pen 2 is initially in the sleep state S0. In this state, in a case of being powered on, the active pen 2 transitions to the discovery state S1. Furthermore, the active pen 2 in the sleep state S0 continuously performs an operation of detecting occurrence of a touch operation. In a case of detecting occurrence of a touch operation, the active pen 2 also transitions to the discovery state S1. The occurrence of the touch operation may be detected, for example, on the basis of the pen pressure detected by the pen pressure detector 22 exceeding a predetermined value or on the basis of induction of charge on the pen tip electrode 21.

In a case of being powered off, the active pen 2 in the discovery state S1, returns to the sleep state S0. Furthermore, the active pen 2 in the discovery state S1 continuously performs the operation of detecting occurrence of a touch operation. In a case of detecting no occurrence of a touch operation for a given time, the active pen 2 returns to the sleep state S0. Also in this case, occurrence of a touch operation may be detected, for example, on the basis of the pen pressure detected by the pen pressure detector 22 exceeding the predetermined value or on the basis of induction of charge on the pen tip electrode 21.

The active pen 2 in the discovery state S1 further performs an operation of detecting the uplink signal US via coupling capacitance between the pen tip electrode 21 and each of the plurality of sensor electrodes 30X and 30Y. In a case where the type 1 uplink signal US is detected as a result of the detecting operation, the active pen 2 transitions to the pairing in-execution state S2. At this time, the active pen 2 temporarily stores the frame structure information, communication configuration data, and pairing state information included in the detected uplink signal US as described above.

In the pairing in-execution state S2, the active pen 2 uses the frequencies and time slots indicated by the stored communication configuration data to transmit the downlink signal DS including the pairing request. The active pen 2 then performs the operation of detecting the uplink signal US, and in a case of detecting the type 2 uplink signal US including the global pen ID of the active pen 2 or the hash value of the global pen ID, the active pen 2 acquires the local pen ID assigned to the active pen 2, from the pairing state information included in the type 2 uplink signal US. The active pen 2 then configures the local pen ID in the memory (not illustrated) in the integrated circuit 26 along with the stored communication configuration data, to establish the pairing state. The active pen 2 also controls the indicator 24 to cause the indicator 24 to provide display for identification of the acquired local pen ID. The active pen 2 subsequently transitions to the operation state S3. On the other hand, in a case of failing to detect, within a predetermined time, the type 2 uplink signal US including the global pen ID of the active pen 2 or the hash value of the global pen ID, the active pen 2 determines that the pairing has failed to return to the discovery state S1.

Each time the active pen 2, having transitioned to the operation state S3, receives the uplink signal US, the active pen 2 references the pairing state information in the uplink signal US. The active pen 2 thus recognizes that the pairing flag corresponding to the local pen ID of the active pen 2 is set to "1," that is, that the sensor controller 31 maintains the pairing with the active pen 2. Then, as long as the active pen 2 can recognize that the sensor controller 31 maintains the pairing with the active pen 2, the active pen 2 maintains the operation state S3 and transmits the downlink signal DS using the configuration based on the pairing state (that is, using the frequencies and time slots indicated by the stored communication configuration data). On the other hand, in a case of recognizing that the pairing flag corresponding to the local pen ID of the active pen 2 is set to "0" and that the sensor controller 31 does not maintain the pairing with the active pen 2, the active pen 2 returns to the discovery state S1.

In the operation state S3, in a case where the uplink signal US is no longer detected (for example, in a case where the active pen 2 has moved to the zone C in FIG. 3), the active pen 2 temporarily transitions to the hold state S4 instead of immediately returning to the discovery state S1. The hold state S4 is intended to maintain the pairing state for a predetermined time even after detection of the uplink signal US fails. The active pen 2 in the hold state S4 cancels the pairing state to return to the discovery state S1 in a case where detection of no uplink signals US continues for a given period or in a case where, in spite of successful detection of the uplink signal US, the pairing state information included in the uplink signal US allows the active pen 2 to recognize that the sensor controller 31 has canceled the state of pairing with the active pen 2. At this time, the active pen 2 suspends holding of the local pen ID and the communication configuration data and controls the indicator 24 to cause the indicator 24 to stop the display for identification of the local pen ID. On the other hand, in a case where, during the hold state S4, the pairing state information included in the uplink signal US allows the active pen 2 to recognize that the sensor controller 31 maintains the pairing with the active pen 2, the active pen 2 returns to the operation state S3.

FIG. 8 is a sequence diagram illustrating operations of the sensor controller 31 and the active pen 2. With reference to FIG. 8, operations of the sensor controller 31 and the active pen 2 related to the pairing will be described again below from a different viewpoint.

The sensor controller 31 transmits, in each frame, the type 1 uplink signal US illustrated in FIG. 5A (S10 and S11). As illustrated in FIG. 8, when the active pen 2 is assumed to receive the type 1 uplink signal US in the frame 1 (S12), the active pen 2 transmits the downlink signal DS including the pairing request (S13). The pairing request includes the global pen ID as described above.

The sensor controller 31 receives the downlink signal DS including the pairing request (S14) and then transmits, in the next frame 2, the type 2 uplink signal US illustrated in FIG. 5B (S15). As described above, the type 2 uplink signal US includes the pairing target active pen information indicative of the global pen ID or the hash value of the global pen ID included in the pairing request, and the pairing state information with the pairing flag for the newly assigned local pen ID having changed from "0" to "1."

The active pen 2 receives the type 2 uplink signal US, and then acquires the local pen ID assigned to the active pen 2, from the pairing state information in the type 2 uplink signal US, and stores the local pen ID. The active pen 2 also stores the communication configuration data included in the last received type 1 uplink signal US (S16). The active pen 2 subsequently uses the frequencies and time slots indicated by the stored communication configuration data to transmit the downlink signal DS (S17). As described above, the downlink signal DS includes the burst signal and the data signal indicative of, for example, the pen pressure detected by the pen pressure detector 22 illustrated in FIG. 2. The sensor controller 31 receives the downlink signal DS and detects the position of the active pen 2 on the basis of the burst signal. The sensor controller 31 also acquires the pen pressure or the like from the data signal, and outputs ink data as described above on the basis of the result of the acquisition (S18).

As described above, according to the present embodiment, the pairing state information is broadcasted by the uplink signal US to all of the one or more active pens 2 paired with the sensor controller 31, the pairing state information indicative of the pairing state of each of the active pens 2. Each of the active pens can thus recognize, by seeing the pairing state information, whether or not pairing with the active pen is maintained in the sensor controller 31. This eliminates a need for unilateral cancelation of the pairing state and bidirectional communication for a check on the pairing state, enabling suppression of degradation of performance caused by a process for maintaining and managing the pairing state.

Furthermore, according to the present embodiment, each of the active pens 2 causes the indicator 24 illustrated in FIG. 2 to provide display for identification of the local pen ID.

Thus, the user can easily recognize the writing attributes assigned to each active pen 2.

The preferred embodiment of the present disclosure has been described. However, the present disclosure is not limited to such an embodiment and may of course be implemented in various manners without departing the spirits of the present disclosure.

For example, in the example described in the present embodiment, the pairing state information including six pairing flags corresponding to respective local pen IDs of 1 to 6 is arranged in each uplink signal US. However, one uplink signal US may include only a part of the pairing state information such that uplink signals US including the pairing state information including six pairing flags corresponding to local pen IDs of 1 to 6 are transmitted alternately with uplink signals US including the pairing state information including six pairing flags corresponding to local pen IDs of 7 to 12. This method is particularly suitable for a case where the uplink signal US is transmitted a plurality of times within one frame (16.7 milliseconds), for example.

What is claimed is:

1. A sensor controller connected to a sensor electrode to detect positions of one or more active pens depending on charge induced on the sensor electrode, the sensor controller comprising:
a processor; and
a memory coupled to the processor, the memory storing instructions that, when executed by the processor, cause the sensor controller to:
detect that the one or more active pens is approaching the sensor electrode, using the sensor electrode;
pair with the detected one or more active pens;
update pairing state information indicative of a pairing state of each of the one or more active pens paired with the sensor controller; and
broadcast the pairing state information from the sensor electrode to the one or more active pens via an uplink signal that is a reference for time synchronization.

2. The sensor controller according to claim 1, wherein the uplink signal includes address information indicative of one of the one or more active pens to which the uplink signal is transmitted, and the pairing state information.

3. The sensor controller according to claim 1, wherein the uplink signal includes address information indicating that the uplink signal is transmitted to all of the one or more active pens, and the pairing state information.

4. An active pen communicating with a sensor controller connected to a sensor electrode, the active pen comprising:
a pen tip electrode; and
an integrated circuit connected to the pen tip electrode, wherein the integrated circuit, in operation,
detects, via a coupling capacitance between the pen tip electrode and the sensor electrode, an uplink signal including pairing state information indicative of a pairing state of each of one or more active pens with which the sensor controller is paired, and
maintains or cancels a pairing state of the active stylus based on the pairing state information that has been detected, and in a case where the pairing state is maintained, transmits a downlink signal configured based on the pairing state of the active stylus.

5. The active pen according to claim 4, wherein the integrated circuit, in operation,
maintains the pairing state of the active stylus for a predetermined period after the uplink signal is no longer detected, and
transmits the downlink signal configured based on the pairing state of the active stylus in a case where the uplink signal is detected again within the predetermined period and where the pairing state information in the uplink signal indicates that the sensor controller maintains pairing with the active pen.

6. The active pen according to claim 4, wherein the integrated circuit, in operation, cancels the pairing state of the active stylus in a case where the pairing state information that has been detected indicates that the sensor controller has canceled the pairing with the active pen.

7. An active pen communicating with a sensor controller connected to a sensor electrode, the active pen comprising:
a pen tip electrode;
an integrated circuit connected to the pen tip electrode; and
an indicator,
wherein the integrated circuit, in operation, controls the indicator to cause the indicator to provide a visual display that indicates a local pen identifier in a case where the local pen identifier is provided to the active pen by an uplink signal transmitted by the sensor controller,
wherein the integrated circuit, in operation,
stores the local pen identifier for a predetermined period after the uplink signal is no longer detected, and
controls the indicator to cause the indicator to stop providing the visual that indicates the local pen identifier in a case where storing of the local pen identifier is suspended after the predetermined period has elapsed.

* * * * *